Aug. 28, 1923.

O. J. MOOSE 1,466,142

WATER HEATER

Filed Sept. 8, 1919

Inventor:
Otto J. Moose.
By, Fred'k J. Sharon
Attorney.

Inventor:
Otto J. Moose.

Aug. 28, 1923.

O. J. MOOSE

WATER HEATER

Filed Sept. 8, 1919

Inventor:
Otto J. Moose,
By, Fred Sharon
Attorney.

Patented Aug. 28, 1923.

1,466,142

UNITED STATES PATENT OFFICE.

OTTO J. MOOSE, OF ST. LOUIS, MISSOURI.

WATER HEATER.

Application filed September 8, 1919. Serial No. 322,243.

*To all whom it may concern:*

Be it known that I, OTTO J. MOOSE, a citizen of the United States, residing in the city of St. Louis and State of Missouri, have invented a new and useful Water Heater, of which the following is a specification.

My invention relates to water heaters, and more particularly to a water heater for heating houses.

The object of my invention is to provide a heater with a centrally arranged water heating head capable of being raised or lowered to a point within the heater where the heat from the burning fuel is most intense, thereby eliminating the necessity of filling the fire box of the heater with a large amount of fuel to obtain the desired results, during moderate weather.

A further object of having the movable water heating head is to be able to completely submerge the same in hot coals when desired, and to provide means whereby the water in a heating system will continue to heat until the fire has completely extinguished itself, thereby obtaining the greatest amount of efficiency from a minimum consumption of fuel.

A further object of the invention is to provide a heater which will give the greatest amount of direct and indirect heating surface possible with the least amount of water to be heated.

A still further object of the invention is to provide passages between the walls of the heater to receive the return flow of water from the heating system and thereby eliminate exposed return pipes adjacent the heater, as much as possible.

A still further object of the invention is to provide means for easily and readily raising or lowering the water heating head which is centrally positioned within the combustion chamber of the heater.

With the above and other objects in view, the invention consists in the novel construction, arrangement and combination of parts described in the following specification and finally pointed out in the claims hereto appended.

Referring to the accompanying drawings forming a part of this specification wherein like characters of reference denote similar parts throughout the several views.

Figure 1:
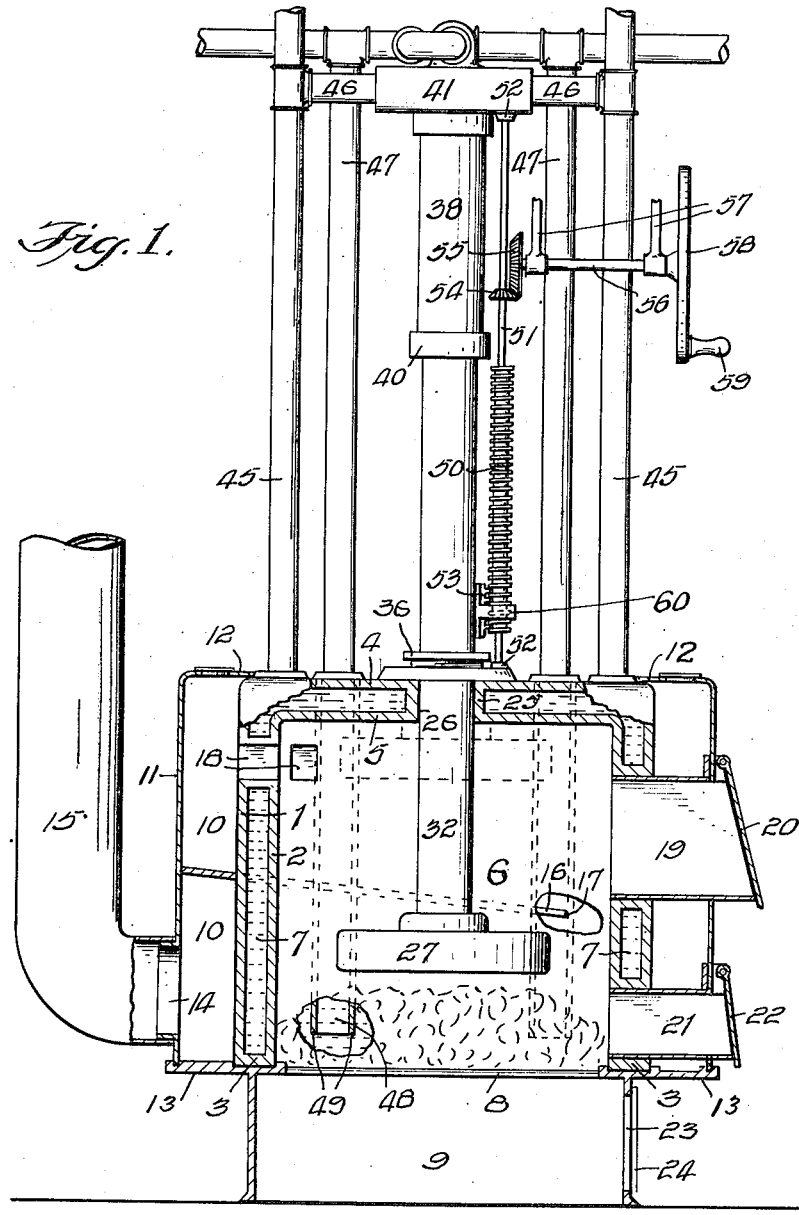
Fig. 1, is a vertical sectional elevation of a heater constructed in accordance with my invention.

Referring to the drawings, the heater comprises a heater body, consisting of suitably spaced outer and inner side walls 1 and 2 having a closed bottom 3, and with the spaced outer and inner top walls 4 and 5 which are cast integral with the side walls 1 and 2, respectively, as clearly shown in Fig. 1, to provide a fire box or combustion chamber 6 within the walls 2 and 5 and a water heating and circulating chamber 7 between the walls 1 and 2, 4 and 5, as clearly shown in Fig. 1. 8 indicates a suitable grate at the bottom of the fire box, while 9 indicates the ash-pit. 10 indicates a smoke chamber formed between the casing 11 and outer shell 1 of the heater. The smoke chamber 10 is closed at its upper and lower ends, as at 12 and 13, respectively. 14 indicates a smoke opening at the lower end of the shell 11 which leads to a suitable smoke pipe 15. The smoke chamber 10 is provided with an inclined partition 16. The partition 16 does not extend completely around the annular smoke chamber 10 but is so arranged as to provide a passage between the ends 17 of the partition, as clearly shown in Fig. 1, to permit the smoke to pass from the upper half of smoke chamber 10 to the lower half thereof. The smoke from the combustion chamber 6 passes into the upper half of smoke chamber 10 through a plurality of suitable flue openings 18, as clearly shown in Fig. 1. By employing the partition 16, it will be observed that the smoke is brought forward around the shell 1 and then permitted to travel rearwardly to the opening 14 for escape. The heat from the smoke and escaping gases will thus tend to keep the outer heater shell 1 warm and prevent same from chilling, as is manifest.

19 indicates a fuel passage leading into the fire box 6 having the door 20. 21 indicates a draft opening having a door 22, while 23 represents an ash-pit opening having the door 24. A circular wall 25 is arranged between the top walls 4 and 5 of the heater to provide a central water tube passage, or opening 26.

27 indicates a movable water heating and circulating head having a plurality of horizontally disposed partitions 28, so arranged, as to divide the head into a plurality of upper water passages 29 and a plurality of lower water passages 30 all communicating at their outer ends with an annular water passage 31. The head 27 is connected at its upper end to a water flow tube 32. The center of the partitions 28 are provided with an opening to receive the lower end of a water return tube 33 carried within the flow tube 32.

The water flow tube 32 passes through the opening 26 in the top of the heater. A suitable packing 34 is carried in a screw threaded recess 35 surroundng the flow tube 32. The packing 34 is held in position by means of a gland 36.

Figure 4:
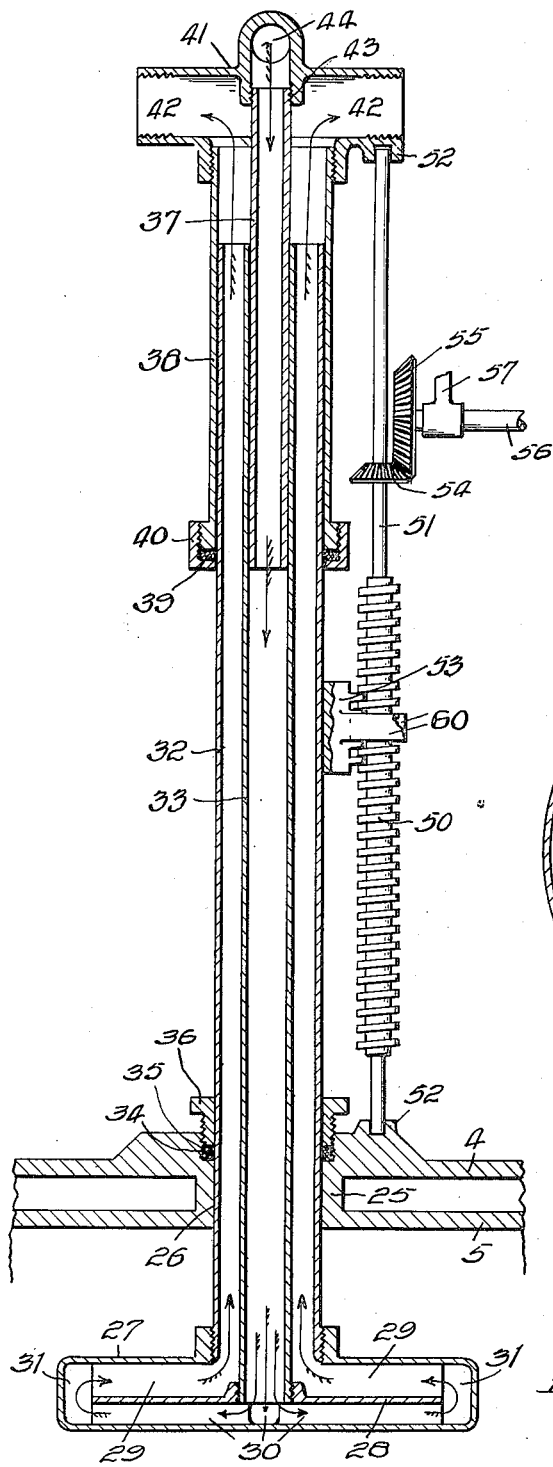
Fig. 4, is a detail in vertical of the movable water heating head and connecting water tubes.
Figure 5:
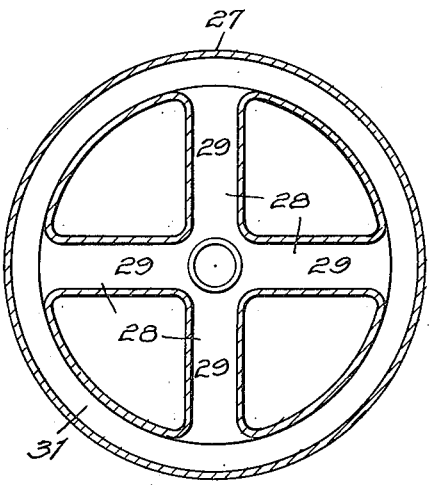
Fig. 5, is a horizontal sectional view of the movable water heating head.

A return tube 37 is telescoped into the upper end of the return tube 33. The flow tube 32 is telescoped into the lower end of an upper flow tube 38, as clearly shown in Fig. 4. A suitable packing 39 encircles the flow tube 32 at the bottom of the upper flow tube 38 and this packing is held in position by means of a suitable screw threaded cap, or gland 40. The upper end of the upper flow tube 38 has suitable connection with a suitable water distributing coupling 41 having the opposed flow passages 42. The upper end of the upper return tube 37 has suitable connection with the distributing coupling, as at 43, so that the return water may flow through the opposed passages 44 of the distributing coupling 41 into the telescoped water return tubes.

A pair of flow pipes 45 are suitably connected to the top wall 3 of the heater and extend upwardly therefrom. A suitable branch pipe 46 connects each flow pipe 45 with the flow passages 42 of the distributing coupling 41. A pair of return pipes 47 are connected at their lower end to the top wall 3 of the heater and each pipe communicates with a return water passage 48 formed between the walls 1 and 2 of the heater, as clearly shown in Fig. 2. The side walls 49 of the return water passages 48 extend nearly to the bottom wall 3 of the heater, so as to deliver part of the return water from the heating system to the water heating chamber 7 at points near the bottom thereof, as will be understood from Figs. 1 and 2. The upper end of each return pipe 47 has suitable connection with the distributing coupling 41 so that the water from the return pipes of the heating system may also pass through the passages 44 of the coupling and through the telescoped return tubes to the water heating and circulating head 27.

Figure 2:
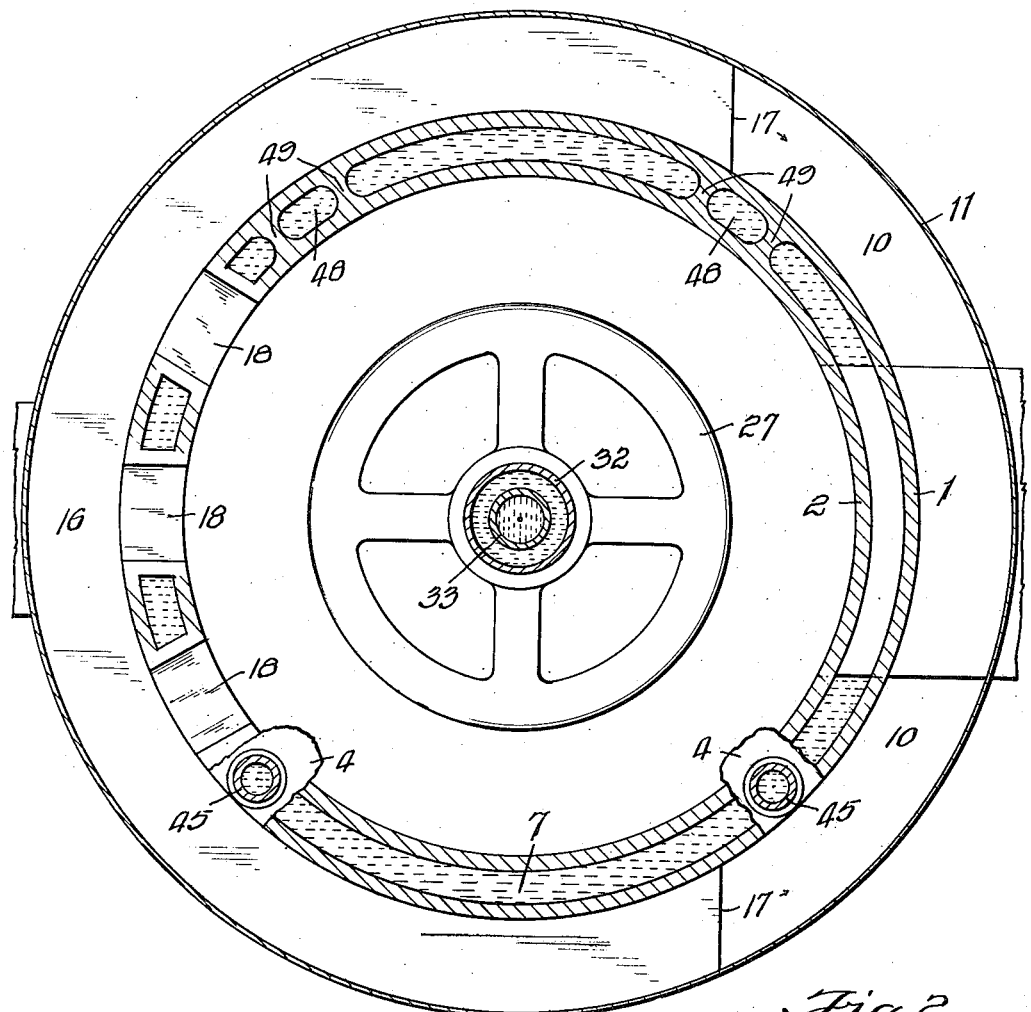
Fig. 2, is a horizontal sectional view taken in line with the smoke outlet passages of the heater body.
Figure 3:
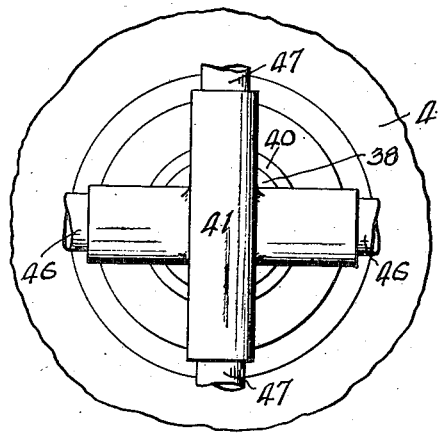
Fig. 3, is a plan view of the water distributing coupling.

The means for raising and lowering the movable water heating and circulating head 27 comprises a worm 50 fixed to the shaft 51. Shaft 51 is supported at its opposite ends in suitable bearings 52. The worm 50 is adapted to engage a rack member 53 suitably fixed to the flow tube 32, as shown in Figs. 1 and 2. 54 indicates a bevel-gear fixed to shaft 51 which meshes with a bevel-gear 55 fixed to the end of a shaft 56 journaled in suitable bearings 57. A hand wheel 58 having a handle 59 is fixed to the outer end of the shaft 56. By turning the hand wheel 58 in one direction, it will be observed, that the gears will impart motion to the worm 50 causing the lower or movable flow and return tubes 32 and 33 to telescope the upper flow and return tubes thereby raising the water heating and circulating head 27 within the combustion chamber 6. By turning the hand wheel 58 in an opposite direction, it is evident that the water heating and circulating head 27 will be lowered within the combustion chamber 6. The rack member 53 is provided with a pair of guide arms 60 to prevent the tube 32 from rotating in its up and down, or telescoping movements.

From the foregoing description, it is evident that I provide an improved type of water heating apparatus which is simple in construction and operation and maximum in efficiency owing to the use of the water heating and circulating head centrally arranged within the combustion chamber and the water chamber 7 surrounding the combustion chamber.

From an inspection of the drawings, it will be observed that I heat the water surrounding the combustion chamber as well as the water within the movable water heating and circulating head. It will be noted that the water chamber 7 between the walls of the heater extends from the top of the heater to the base thereof, as well as extending across the top of the heater, as clearly shown in Fig. 1.

The many advantages of a water heating apparatus of the class hereindescribed will readily suggest themselves to those skilled in the art to which it appertains.

I do not wish to be understood as having limited myself to the exact details of construction shown and described, but desire to have it understood that the device I have shown in the drawings is merely illustrative, as it is manifest that various minor changes may be made in the form, shape and particular arrangement of parts without departing from the spirit of my invention, hence reserve the right to make any such changes or modifications as may fairly fall within the scope of the appended claims when fairly construed.

What I claim is:

1. In an auxiliary heater, a water heating and circulating head having a plurality of horizontally disposed partitions, so arranged as to divide the head into a plurality of upper radially directed water passages and a plurality of lower radially directed water passages all of which communicate at their outer ends with an annular water passage, a telescopic water supply pipe connected at its lower end to said partition and communicating with the lower water passages and connected at its upper end to a stationary coupling, and a telescopic water supply pipe connected at its lower end to the upper wall of said water heating and circulating head and connected at its upper end to said stationary coupling, a screw movably supported between said stationary coupling and a furnace, a threaded member fixed to the movable water discharge pipe through which said screw passes and means for turning said screw for raising or lowering the water head within the combustion chamber of a furnace.

2. In an auxiliary heater, a water heating and circulating head having a plurality of horizontally disposed partitions, so arranged as to divide the head into a plurality of upper radially directed water passages and a plurality of lower radially directed water passages all of which communicate at their outer ends with an annular water passage, a water supply pipe connected to said partition and communicating with the lower water passages, a discharge water pipe arranged concentric with the water supply pipe and connected at its lower end to the aforesaid head and communicating with the upper water passages thereof, said water supply pipe and water discharge pipe having telescopic connection with stationary water supply pipe and a discharge pipe, and means for raising and lowering said water heater and circulating head within the combustion chamber of a furnace.

3. In a hot water heating system of the class described, a heater having a combustion chamber and a water circulating chamber surrounding the sides and top of the combustion chamber, a shell surrounding the heater body to establish a smoke chamber, water return pipes having communication with water return passages formed between the walls of the heater body, flow pipes communicating with the upper end of the water chamber, a water distributor coupling connected to the return and flow pipes, a water heating and circulating head suspended within the combustion chamber, telescopic water supply pipes for controlling the flow of return water from a heating system and the water distributing coupling to the water heating and circulating head, concentrically arranged telescopic discharge pipes for controlling the flow of the heated water from the heater to the distributing coupling from where it is distributed to the flow pipes of the heating system and screw mechanism for raising or lowering said water heating and circulating head within the combustion chamber of the heater.

In testimony whereof, I have hereunto signed my name to the specification.

OTTO J. MOOSE.